United States Patent
Benenati

(10) Patent No.: US 6,746,231 B1
(45) Date of Patent: Jun. 8, 2004

(54) THERMAL EQUALIZING SYSTEM FOR INJECTION MOLDING APPARATUS

(76) Inventor: Salvatore Benenati, 1602 Westminster La., Wall, NJ (US) 07719

( * ) Notice: Subject to any disclaimer, the term of this patent is extended or adjusted under 35 U.S.C. 154(b) by 0 days.

(21) Appl. No.: 10/222,458

(22) Filed: Aug. 17, 2002

Related U.S. Application Data

(60) Provisional application No. 60/313,120, filed on Aug. 17, 2001.

(51) Int. Cl.[7] ............................................... B29C 45/72
(52) U.S. Cl. ........................ 425/547; 425/549; 425/572
(58) Field of Search ................................. 425/547, 549, 425/572, 552, 551

(56) References Cited

U.S. PATENT DOCUMENTS 6,290,882 B1 * 9/2001 Maus et al. .................. 425/552

* cited by examiner

Primary Examiner—Tim Heitbrink
(74) Attorney, Agent, or Firm—Struab & Pokotylo; Michael P. Straub

(57) ABSTRACT

Methods and apparatus for implementing a thermal equalizing system for use within a hot runner system of a plastic injection molding apparatus are described. The thermal equalizing system employs at least one thermal fluid circulating circuit which uses a heat transfer fluid to remove excess heat from overheated areas within the injection molding apparatus and/or to add heat to under heated areas within the injection molding apparatus.

9 Claims, 3 Drawing Sheets

THERMAL EQUALIZING SYSTEM FOR INJECTION MOLDING APPARATUS

RELATED APPLICATIONS

This application claims the benefit of U.S. Provisional patent application Ser. No. 60/313,120 filed Aug. 17, 2001.

FIELD OF THE INVENTION

The present invention relates to a thermal equalizing system for use within a hot runner system of a plastic injection molding apparatus for maintaining a constant internal temperature within the apparatus. More particularly, the thermal equalizing system employs at least one thermal fluid circulating circuit which uses a heat transfer fluid to remove excess heat from overheated areas within the injection molding apparatus and/or to add heat to under heated areas within the injection molding apparatus.

BACKGROUND OF THE INVENTION

In operating an injection molding apparatus, it is a common problem that the internal components of the molding apparatus usually require precise and equal temperatures throughout. But typically, the internal components of the molding apparatus develop a temperature differential between different areas of the same component. This is due to inequalities in the heat input and heat output (losses) in various areas of the same component.

One attempt to solve the foregoing problem involves retrofitting such injection molding apparatus with external circulating pumps and/or external fluid heaters for circulating isothermal fluids within channels added to the molding apparatus for that purpose. Such retrofitting has proven to be cumbersome, expensive to implement, and impossible in situations where space is limited. One such example is a hot runner system of an injection molding apparatus, where space and cost limitations make the use of external circulating systems impractical to implement. Accordingly, there remains a need for a thermal equalizing system having an internal circulating fluid for maintaining a constant temperature within the internal components of the molding apparatus, without using means (pumps, heaters, and the like) external to the molding apparatus as previously described.

In the foregoing circumstances, it is an object of the present invention to provide a thermal equalizing system that is compact, self-contained, and creating an adiabatic cycle (a thermodynamic process occurring without the gain or loss of temperature) for producing a constant and equal temperature within the internal components of the molding apparatus.

Another object of the present invention is to provide a thermal equalizing system having a circulating thermal fluid circuit which is self-contained within one or more of the internal components of the molding apparatus, whereby a circulating heat transfer fluid is utilized to remove excess heat from overheated areas and to add heat to under heated areas in a cost effective and economical manner.

BRIEF DESCRIPTION OF THE DRAWINGS

Further, objects, features and advantages of the present invention will become apparent upon consideration of the following detailed description of an exemplary embodiment considered in conjunction with the accompanying drawings, in which.

DETAILED DESCRIPTION OF THE EXEMPLARY EMBODIMENT

Figure 1:
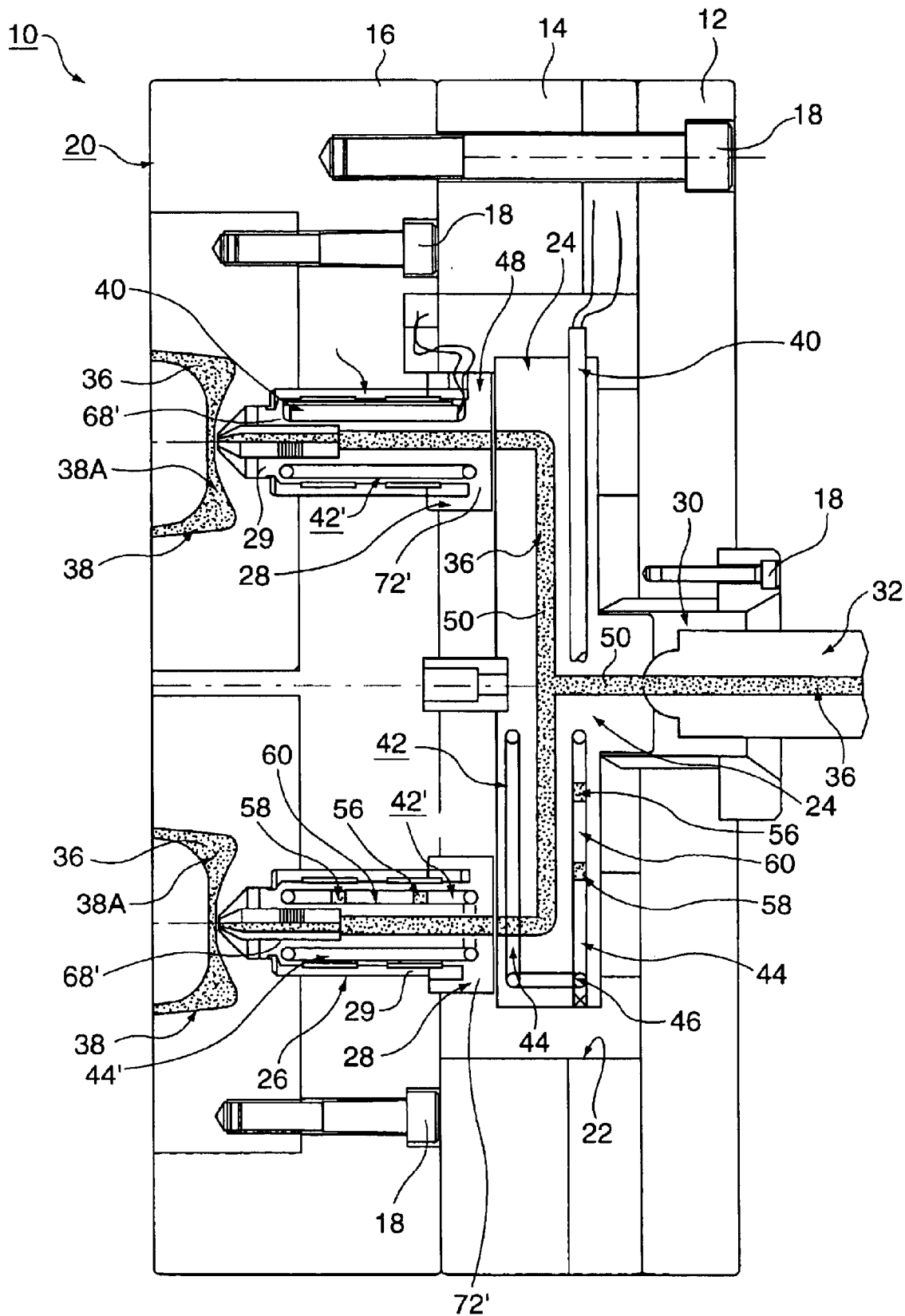
FIG. 1 is a cross-sectional view of an injection molding apparatus constructed in accordance with the present invention showing a pair of heated nozzles-and a heated manifold.

Referring to FIG. 1, an injection molding apparatus 10 includes a series of plates 12, 14 and 16 fastened together with machine screws 18 to form a housing 20 having a manifold chamber 22 for receiving a manifold member 24. The housing 20 further includes a plurality of nozzle compartment openings 26, each of which receives a cavity nozzle 28 having a nozzle body 29. The housing 20 also includes a molding press nozzle cavity 30 for receiving an injection molding press nozzle 32 therein. The nozzle 32 is part of the barrel of an injection molding machine (not shown) and is held against the mold by hydraulic or mechanical pressure developed by the molding machine such that plastic resin material 36 which is heated within the molding press barrel can be injected by conventional means from the barrel into the mold without leaking into the manifold member 24, which in turn distributes the heated plastic resin material 36 to the cavity nozzles 28. The cavity nozzles 28 in turn feed the heated plastic resin material 36 to a plurality of mold cavities 38, each cavity forming a plastic part 38A. To facilitate consideration and discussion, it should be noted that the male or core part of the molding apparatus 10 is not shown in FIG. 1.

Still referring to FIG. 1, the manifold member 24 is kept heated to an appropriate temperature by conventional heating elements 40, which are monitored by the use of thermocouples (not shown) and regulated by electronic controllers (not shown). Similarly, the cavity nozzle 28 is also heated (see FIG. 1) by a pair of conventional heating elements 40', which are located within the nozzle body 29 and which are also monitored by the use of thermocouples (not shown) and regulated by electronic controllers (not shown). Alternatively, the heating elements 40' can be placed over the body 29 of the cavity nozzle 28, as would be the case if band heaters (not shown) were used. Due to the constraints in locating and positioning the heaters 40, 40', there are various heat losses occurring throughout different component areas within the molding housing 20, the manifold member 24 and cavity nozzles 28. Thus, the temperatures within the manifold member 24 and within each of the cavity nozzles 28 can vary within each of these components, such that the temperature from one component area to another component area produces a temperature differential (i.e., "hot spots" and "cold spots") between these different component areas which is enough to degrade the plastic resin material 36 within the molding apparatus 10, thereby resulting in defective plastic parts. A single thermocouple (not shown) is located in the manifold member 24 and in each of the cavity nozzles 28. Each thermocouple measures the temperature within the corresponding component (i.e., manifold member 24 and cavity nozzles 28), only at a single location, which is most often not a "hot spot" or a "cold spot" within the component. Thus, existing temperature differential within each component are not accurately measured. In the foregoing circumstances, i.e., where the "hot spots" and "cold spots" within the components are not being measured, the temperature measured by the single thermocouple in each component is often misleading in regard to the true temperature conditions within each component. Thus, the temperatures that are monitored by the thermocouples (not shown) at a single location in the manifold member 24 and in each of the cavity nozzles 28 are still within the required temperature parameters. This is because the thermocouples will accurately measure the temperatures only at this single location, and not necessarily the "hot spots" and "cold spots" that occur at other locations within the manifold member 24 and the nozzle body 29.

Figure 6:
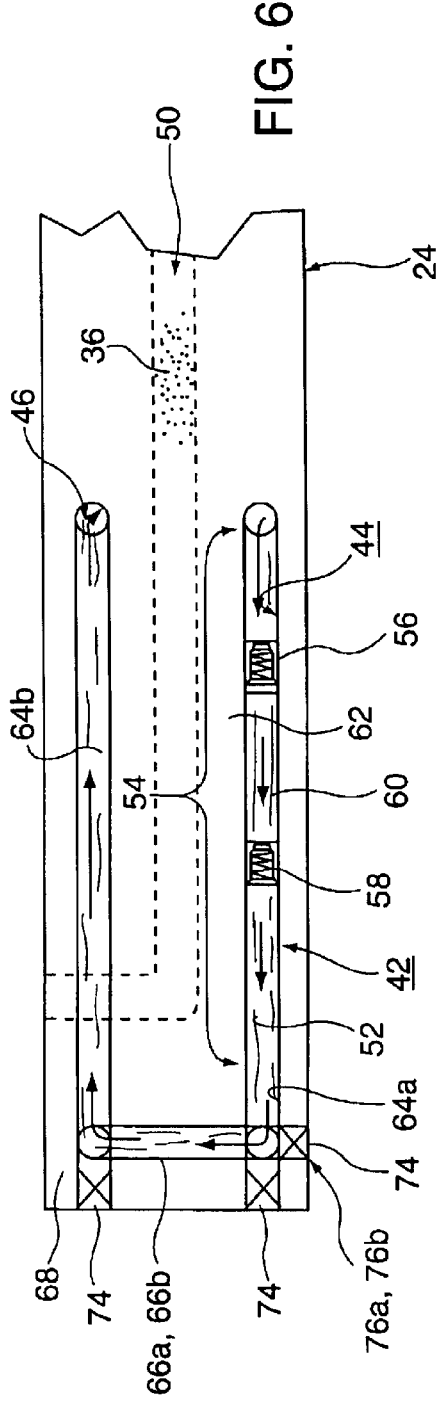
FIG. 6 is a cross-sectional view of the manifold member depicted in FIG. 1 showing the thermal fluid circulation circuit therein.
Figure 7:
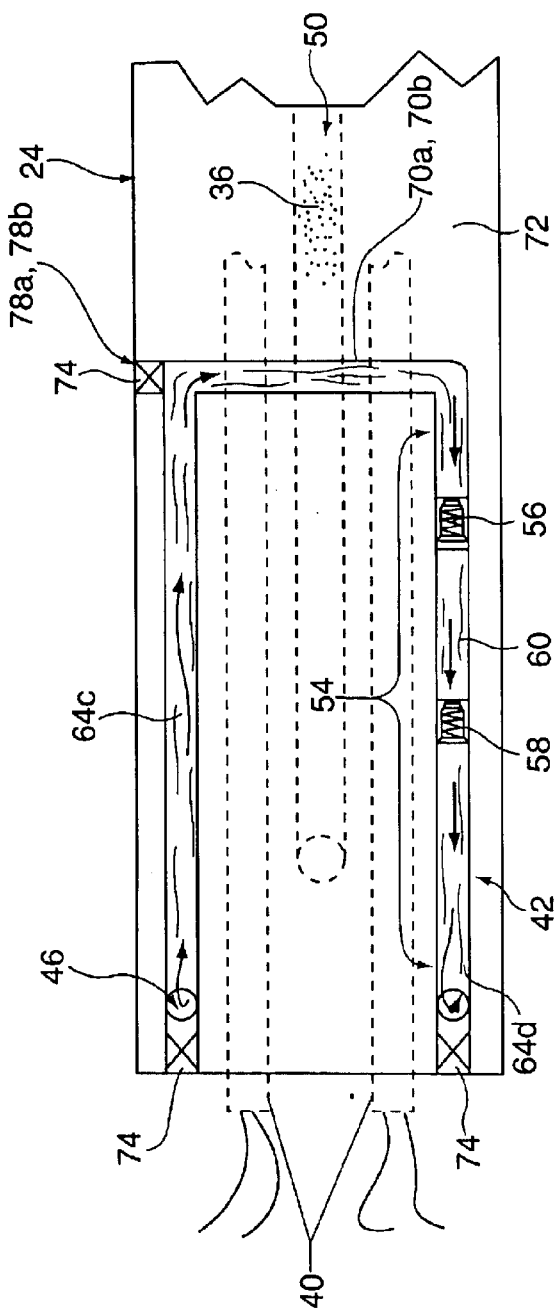
FIG. 7 is a cross-sectional view of the manifold member depicted in FIG. 1 rotated 90°.

In order to alleviate the aforementioned problem, thermal fluid circulation circuits 42 and 42' are placed within the manifold member 24 and within each of the cavity nozzles 28, respectively. With reference to FIGS. 6 and 7, each thermal fluid circulation circuit 42 for the manifold member 24 includes a closed loop circuit 44 having a passageway 46 which is axially aligned with a manifold passageway 50 that receives the heated plastic resin material 36. The circuit 44 is constructed to form a continuous closed loop having heat transfer fluid within the passageway 46. An elongated section 54 of the circuit 44 includes a first check valve 56 and a second check valve 58 separated by a chamber 60 therebetween. The first and second check valves 56, 58(see FIG. 6)are placed in a unidirectional mode, which allows the heat transfer fluid to pass through each valve in one direction while impending fluid flow in the opposite direction. When the heat transfer fluid expands in the chamber 60, due to overheating of a hot spot 62 in the manifold member 24, a small quantity of the heat transfer fluid is expelled through the second check valve 58, creating a slightly higher pressure in the passageway 46 and a slight vacuum in the chamber 60, which then draws the heat transfer fluid into the chamber 60 from passageway 46 through the first check valve 56 (see FIGS. 6 and 7), whereby the heat transfer fluid within the chamber 60 has the ability to once again expand. This fluid cycle within each thermal fluid circulation circuit 42 will repeat itself as long as there is a thermal differential of the heat transfer fluid between the chamber 60 and the passageway 46.

The length of the chamber 60 can vary in proportion up to one-half (½) of the entire lineal length of the circuit 44, without affecting the operation of the molding apparatus 10 in a substantial way. The preferred location of the chamber 60 is in close proximity to the hot spot 62 within the manifold member 24, as shown in FIGS. 6 and 7.

The manifold member 24 is substantially rectangularly-shaped and requires intricately connected passageways 46 the manifold member 24 in order to complete the circuit 44 for circulating the heat transfer fluid within the thermal fluid circulation 42 (see FIGS. 6 and 7). In the fabrication of manifold member 24, as depicted in FIGS. 6 and 7, four passageway openings 64a, 64b, 64c and 64d are drilled parallel to the axial length of manifold passageway 50 within the manifold member 24. Next, two passageway openings 66a and 66b are drilled at right angles within an outer end (anterior) section 68 of the manifold member 24 such that the passageway opening 66a interconnects with axial passageway openings 64a and 64b and the passageway opening 66b interconnects with axial passageway openings 64c and 64d(see FIG. 6). Further, two more passageway openings 70a and 70b are drilled at right angles within an inner end (posterior) section 72 of the manifold member 24 such that the posterior passageway opening 70a interconnects with axial passageway openings 64b and 64c and the posterior passageway opening 70b interconnects with axial passageway openings 64a and 64d (see FIG. 6). Next, metal plugs 74 are placed at end opening locations 76a and 76b, and 78a and 78b of the anterior and posterior sections 68 and 72, respectively, of manifold member 24 and then subsequently welded to the body 25 of manifold member 24 (see FIGS. 6 and 7). Prior to the last plug 74 being placed and welded to the body 25, heat transfer fluid and the check valves 56, 58 are added to circuit 44 (see FIG. 7). Proper care is taken to allow room for fluid expansion without over-pressurizing the closed circuit 44 of the thermal fluid circulation circuit 42 within the manifold member 24. The thermal equalizing system will work whether there is high pressure or low pressure within the thermal fluid circulation circuit 2. This is so because there will always be a differential pressure proportional to the temperature differential of the heat transfer fluid between the hotter and colder sections of the thermal fluid circulation circuit 42.

Figure 2:
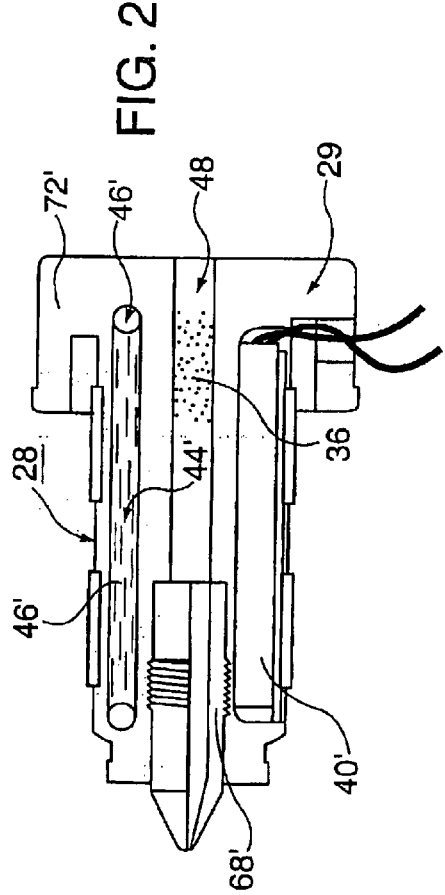
FIG. 2 is a cross-sectional view of the heated nozzle depicted in FIG. 1 showing the heating means rotated 90° and a fluid circulating channel.
Figure 3:
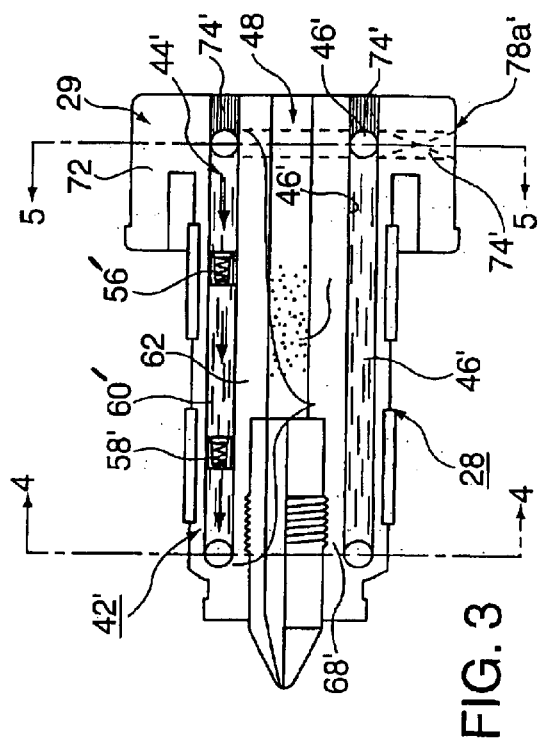
FIG. 3 is a cross-sectional view of the heated nozzle depicted in FIG. 1 showing the fluid circulating channels.

With reference to FIGS. 2 and 3, each thermal fluid circulation circuit 42' for cavity nozzle 28 includes a closed loop circuit 44' having a passageway 46' which is axially aligned with a nozzle passageway 48 that receives the heated plastic resin material 36. The circuit 44' is constructed to form a continuous closed loop having an heat transfer fluid within the passageway 46'. An elongated section 44' of the circuit 44 (being parallel to the nozzle passageway 48 of cavity nozzle 28) includes a first check valve 56' and a second check valve 58' separated by a chamber 60' therebetween. The first and second check valves 56', 58' (see FIG. 3) are placed in a unidirectional mode, which allows the heat transfer fluid to pass through each valve in one direction while impeding fluid flow in the opposite direction. When the heat transfer fluid expands in the chamber 60', due to overheating of a hot spot 62' in the nozzle body 29, a small quantity of the heat transfer fluid is expelled through the second check valve 58', creating a slightly higher pressure in the passageway 46' and a slight vacuum in the chamber 60', which then draws the heat transfer fluid into the chamber 60' from passageway 46' through the first check valve 56' (See FIGS. 1 and 3), whereby the heat transfer fluid within the chamber 60' has the ability to once again expand. This cycle within each thermal fluid circulation circuit 42' will repeat itself as long as there is a thermal differential of the heat transfer fluid between the chamber 60' and the passageway 46'.

The length of the chamber 60' can vary in proportion up to one-half (½) of the entire lineal length of the circuit 44', without affecting the operation of the molding apparatus 10 in a substantial way. The preferred location of the chamber 60' is in close proximity to the hot spot 62' within the body 29 of cavity nozzle 28, as shown in FIG. 3.

Figure 5:
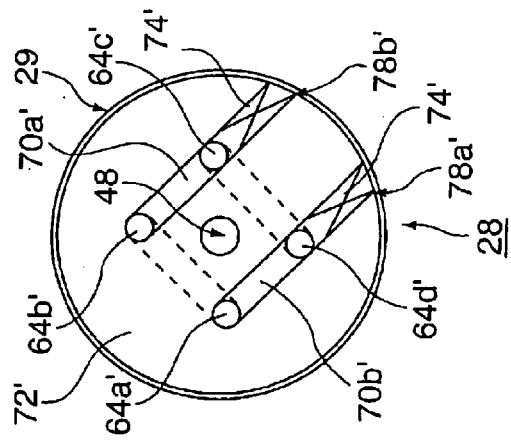
FIG. 5 is a cross-sectional view of the heated nozzle of FIG. 3, taken along section lines 5—5 and looking in the direction of the arrows.
Figure 4:
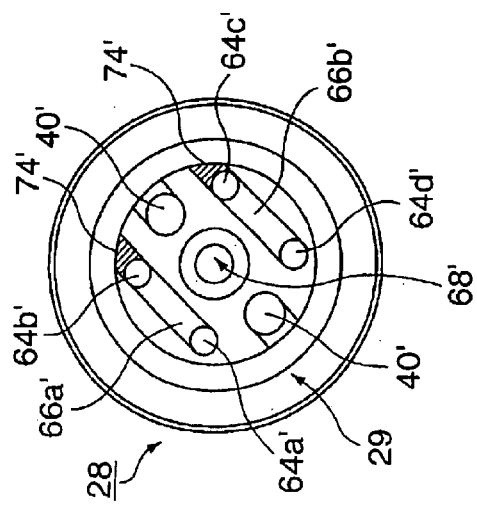
FIG. 4 is a cross-sectional view of the heated nozzle of FIG. 3, taken along section lines 4—4 and looking in the direction of the arrows.

Each cavity nozzle 28 is substantially cylindrically-shaped and requires intricately connected passageways 46' within the body 29 portion of the cavity nozzle 28 in order to complete the circuit 44' for circulating the heat transfer fluid within the thermal fluid circulation circuit 42' (see FIGS. 2 and 3). In the fabrication of cavity nozzle 28, as depicted in FIGS. 3, 4 and 5, four passageway openings 64a', 64b', 64c' and 64d' are drilled parallel to the axial length nozzle passageway 48 within the body 29 of the cavity nozzle 28. Next, the two passageway openings 66a' and 66b' are drilled at right angles within a front end (anterior) section 68' of the cavity nozzle 28 such that the passageway opening 66a' interconnects with axial passageway openings 64a' and 64b' and the passageway opening 66b' interconnects with axial passageway openings 64c' and 64d' (see FIG. 4). Further, two more passageway openings 70a' and 70b' are drilled at right angles within a posterior section 72' of the cavity nozzle 28 such that the posterior passageway opening 70a' interconnects with axial passageway openings 64b' and 64c' and the posterior passageway opening 70b' interconnects with axial passageway openings 64a' and 64d' (see FIG. 5). Next, metal plugs 74' are placed at end opening locations 76a' and 76b', and 78a' and 78b' of the anterior and posterior sections 68' and 72' , respectively, of cavity nozzle 28 and then subsequently welded to the nozzle body 29 (see FIGS. 3, 4 and 5). Prior to the last plug 74' being placed and welded to the body 29, heat transfer fluid and the check valves 56', 58' are added to circuit 44' (see FIG. 3). Proper care is taken to allow room for fluid expansion without over-pressurizing the closed circuit 44' of the thermal fluid circulation circuit 42' within the body 29 of the cavity nozzle 28

The heat transfer fluid can be of diverse composition and qualities depending upon the type of molding apparatus 10 and the operating range of that molding apparatus. However, a low viscosity heat transfer fluid specifically manufactured for heat transfer applications, such as those sold by The Dow Chemical Company of Midland, Mi., under the trademark "DOWTHERM", is preferred. Once the heat transfer fluid starts circulating within the thermal fluid circulation circuits 42, 42', the heat transfer fluid will remove or add heat at a rate equal to several times the rate of simple convection, thus creating an economical and compact means for equalizing and stabilizing the appropriate temperature within the manifold member 24 and cavity nozzles 28, respectively. For example, this adiabatic cycle occurs because the heated heat transfer fluid has been raised in temperature from the "hot spots", such as the hot spot 62, within the manifold member 24, such that the heated heat transfer fluid is expelled from the chamber 60 via the second check valve 58 while cooler heat transfer fluid from the circuit 44 enters the chamber 60 via the first check valve 56, thereby causing the "hot spots" to cool down and the "cold spots" to heat up.

It should be understood that the embodiment described herein is merely exemplary and that a person skilled in the art may make many variations and modifications without departing from the spirit and scope of the invention. All such variations and modifications are intended to be included within the scope of the invention.

What is claimed is:

1. An injection molding apparatus adapted to convey molten plastic material, said molding apparatus comprising:
   a body including a through passage adapted for the conveyance of molten plastic material and at least one closed loop heat transfer fluid circuit, said closed loop heat transfer fluid circuit including a plurality of interconnected heat transfer fluid cavities filled with a heat transfer fluid; and at least one unidirectional fluid check valve interconnecting two of said heat transfer fluid cavities, said heat transfer fluid flowing through the unidirectional fluid check valve in a single direction in response to heat transfer fluid pressure differential caused by uneven heating of said body, the flowing of said heat transfer fluid causing heat transfer fluid circulation in said closed loop heat transfer fluid circuit.

2. The injection molding apparatus of claim 1, further comprising:
   heater means for heating at least a portion of said body; and
   wherein at least some of said heat transfer fluid cavities run parallel to said through passage.

3. The injection molding apparatus of claim 2,
   wherein said interconnected heat transfer fluid cavities include at least some straight fluid passages which exit through the side of said body,
   said injection molding apparatus further comprising:
   a plurality of plugs inserted into ends of said at least some straight fluid passages at points where said straight fluid passages exist through said body thereby preventing heat transfer fluid leakage from said body.

4. The injection molding apparatus of claim 1, wherein said apparatus includes a plurality of said unidirectional check valves positioned in heat transfer fluid passageways at intervals, the intervals between said check valves forming chambers, heat transfer fluid expanding in at least one chamber due to heating being expelled through one of the unidirectional check valves into an adjacent chamber promoting unidirectional circulation of said fluid through said closed loop heat transfer circuit.

5. The apparatus of claim 4, wherein check valves are positioned at intervals which are equal to or less than one half the length of said closed loop heat transfer fluid circuit.

6. The injection molding apparatus of claim 3,
   wherein said body has an elongated cylindrical shape and is adapted for use as a plastic injection molding press barrel.

7. The injection molding apparatus of claim 3, wherein said body has a elongated cylindrical shape and is adapted to be used as a hot runner plastic injection molding nozzle.

8. The injection molding apparatus of claim 3, having a rectangular elongated shape and is adapted to be uses as a hot runner plastic injection molding manifold for distributing molten plastic to a plurality of impressions of a plastic injection mold.

9. The injection molding apparatus of claim 1, further including:
   a heater slidably mounted to said body.

* * * * *